United States Patent
Hediger et al.

(10) Patent No.: US 6,572,334 B2
(45) Date of Patent: Jun. 3, 2003

(54) ROTOR OF A DIRECTLY GAS-COOLED ELECTRICAL TURBOMACHINE

(75) Inventors: Daniel Hediger, Othmarsingen (CH); Ernoe Stefan, Brugg (CH)

(73) Assignee: Alstom (Switzerland) Ltd, Baden (CH)

(*) Notice: Subject to any disclaimer, the term of this patent is extended or adjusted under 35 U.S.C. 154(b) by 0 days.

(21) Appl. No.: 09/996,692

(22) Filed: Nov. 30, 2001

(65) Prior Publication Data

US 2002/0175590 A1 Nov. 28, 2002

(30) Foreign Application Priority Data

Dec. 4, 2000 (DE) .......................... 100 60 122

(51) Int. Cl.$^7$ ............................... F01D 5/08
(52) U.S. Cl. .................. 416/95; 416/93 R; 416/189
(58) Field of Search .................. 416/95, 93 R, 416/189, 191, 192, 193, 220 R, 207, 214 A; 310/89, 90, 91, 42, 55

(56) References Cited

U.S. PATENT DOCUMENTS

| | | | |
|---|---|---|---|
| 2,994,793 A | | 8/1961 | Sills |
| 3,406,632 A | * | 10/1968 | Duport et al. |
| 3,552,877 A | * | 1/1971 | Christ et al. |
| 4,013,378 A | * | 3/1977 | Herzog ........................ 415/209 |
| 4,216,399 A | * | 8/1980 | Bartheld et al. ............... 310/91 |
| 4,642,499 A | * | 2/1987 | Brem ........................... 310/89 |
| 5,257,906 A | * | 11/1993 | Gray et al. ................... 415/226 |
| 5,603,604 A | * | 2/1997 | Norris et al. ............. 415/208.1 |
| 6,261,055 B1 | * | 7/2001 | Owczarck .................... 415/148 |

FOREIGN PATENT DOCUMENTS

EP 0 849 859 12/1997

* cited by examiner

Primary Examiner—Edward K. Look
Assistant Examiner—James M McAleenan
(74) Attorney, Agent, or Firm—Burns, Doane, Swecker & Mathis, L.L.P.

(57) ABSTRACT

The cap plate has an axially recessed region with a shoulder. The gas guiding ring half shells have a respective projecting rib. A retaining ring consisting of two retaining ring halves abuts with its first leg in the shoulder and is connected by means of fillister head screws to the cap plate. The gas guiding ring half shells are positioned with respect to the cap plate with clearance fit in the radial and axial direction. The ribs have a spacing in the peripheral direction at the separation place of the gas guiding ring half shells in order to form gaps. At the same location, the first leg of the retaining ring halves is interrupted for the formation of recesses aligned with the gaps. Fixing wedges are inserted in the region of the gaps and of the recesses and are screwed to the cap plate. These fixing wedges transfer the tangential forces from the gas guiding ring half shells to the retaining ring halves.

7 Claims, 4 Drawing Sheets

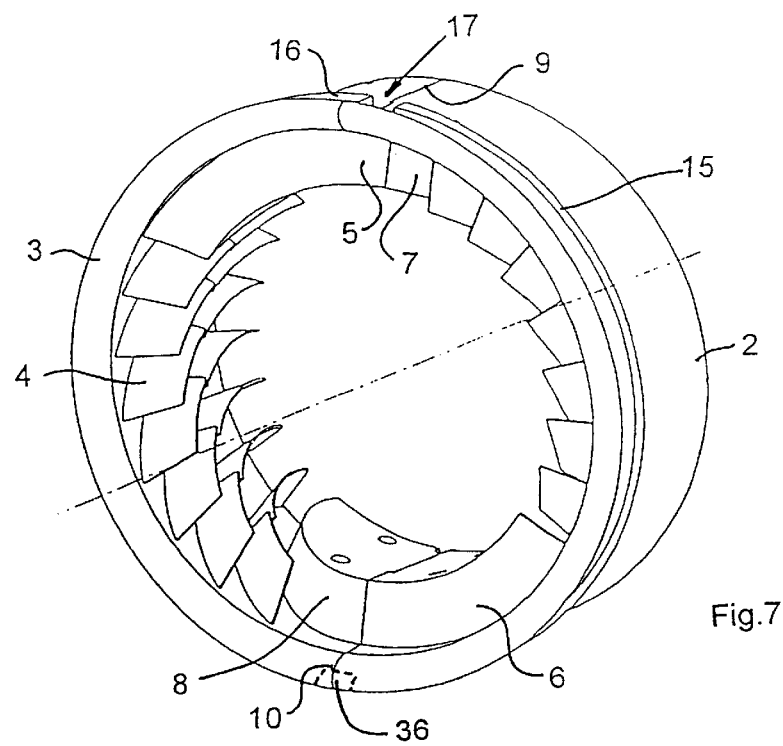
Fig. 7
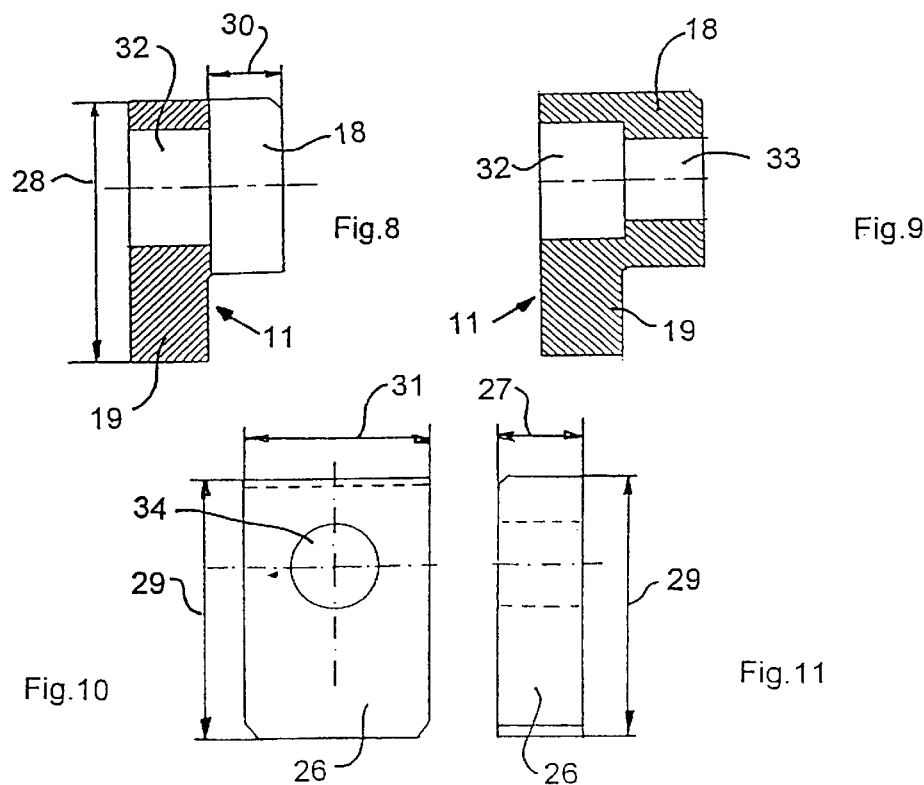
Fig. 8    Fig. 9
Fig. 10    Fig. 11

ROTOR OF A DIRECTLY GAS-COOLED ELECTRICAL TURBOMACHINE

FIELD OF THE INVENTION

The present invention relates to a rotor of a directly gas-cooled electrical turbomachine, which rotor has at each axial end a respective gas guiding ring consisting of two gas guiding ring half shells, respectively connected to a cap plate of the rotor. It also relates to a process for the assembly of such a rotor.

BACKGROUND OF THE INVENTION

The rotor cap, particularly in rotors of a turbogenerator with direct gas cooling, is known to undergo ovalization due to the centrifugal force which acts on it and on the windings lying therebeneath. This ovalization also relates to the cap plate and the gas guiding ring. Due to the pressure difference arising at the gas guiding ring half shells during operation of the turbogenerator, a known axial displacement results in known turbogenerators, and produces wear. Furthermore, during shaft rotation (rotational speed less than 40 rpm) of known turbogenerators, a tangential and radial movement of the gas guiding ring half shells arises, which leads to additional wear in the cap plate.

SUMMARY OF THE INVENTION

The invention thus has as its object to provide a rotor of a directly gas-cooled turbomachine, in which axial displacements of the gas guiding ring half shells and also tangential and radial movements of the gas guiding ring half shells are made impossible.

The rotor according to the invention is distinguished by fixing wedges, a respective one of which is inserted at the place of the separation between mutually opposing end sections of the gas guiding ring half shells, abuts on both sides on the end region sections, and is securely connected to the cap plate. Moreover, the rotor has a retaining ring consisting of two retaining ring halves, connected to the gas guiding ring and likewise connected to the cap plate, in order to position the gas guiding ring axially and radially with respect to the cap plate. The respective separation place of the gas guiding ring half shells is offset here by at least about 90° from the respective separation place of the retaining ring halves.

The process is characterized in that the gas guiding ring half shells are inserted into the cap plate and pressed apart with respect to this, then the fixing wedges are fitted into the gaps between the mutually opposing end sections of the gas guiding ring half shells and are secured, the gas guiding ring half shells are released and the retaining ring halves are positioned on the gas guiding ring half shells, and finally the retaining ring halves are screwed to the cap plate.

The advantages of the invention are particularly that the retaining ring halves position the gas guiding ring half shells both axially and also radially, and simultaneously also, by means of the fixing wedges, absorb the tangential forces when a short circuit occurs. The retaining ring halves are held in a recessed region against the centrifugal forces. It is thus ensured that both in the stationary state and also during shaft rotation, the gas guiding ring half shells are fixed in every direction, so that no wear arises. However, the gas guiding ring half shells can accommodate the ovalization of the cap plate in operation.

BRIEF DESCRIPTION OF THE DRAWINGS

The subject of the invention is described in detail hereinbelow by way of example using drawings of a mode of embodiment.

FIG. 7 is a diagrammatic illustration of a gas guiding ring consisting of two gas guiding ring half shells, without retaining ring, FIG. 8 shows a section along the line VIII—VIII of FIG. 5, FIG. 9 shows a section along the line IX—IX of FIG. 5, FIG. 10 shows a front view of a fixing wedge, FIG. 11 shows a side view of the fixing wedge of FIG. 10.

DETAILED DESCRIPTION OF THE PREFERRED EMBODIMENT

Figure 1:
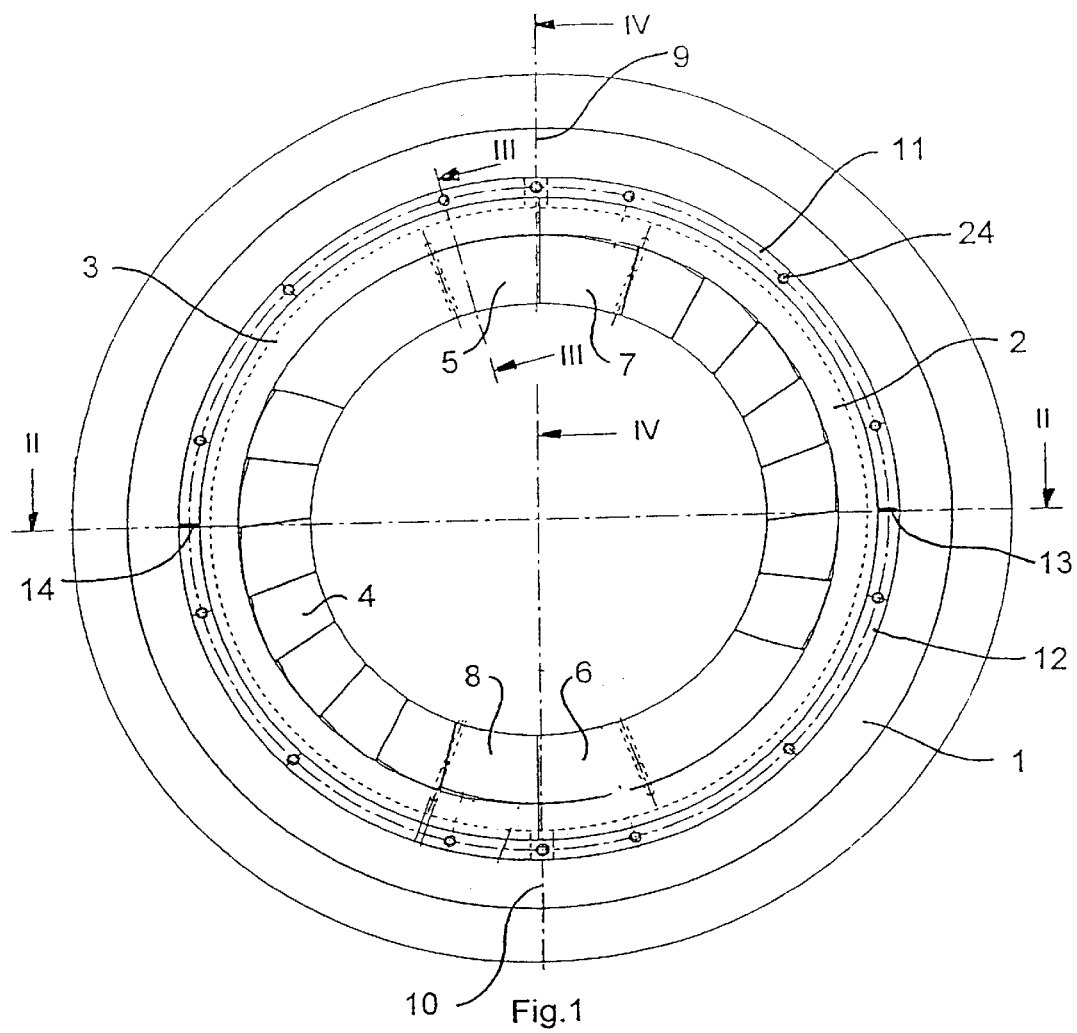
FIG. 1 shows a front view of a rotor of a turbogenerator with a gas guiding ring and a retaining ring.

The rotor constituted according to the present invention has (at both axial ends) a cap plate 1 and also a gas guiding ring consisting of two half shells 2 and 3. The gas guiding ring half shells 2 and 3 contain the gas guiding blades 4. The reference numerals 5, 6, 7 and 8 denote the filler pieces, known per se, between respective adjacent gas guiding blades 4. The reference numbers 9 and 10 furthermore denote the separation places between the gas guiding ring half shells 2 and 3. The generator windings 21 are furthermore drawn in FIG. 2.

Figure 2:
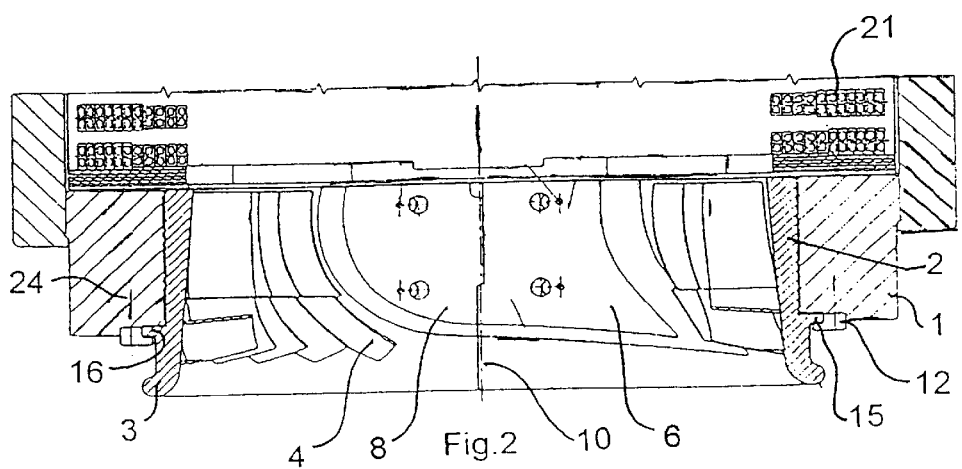
FIG. 2 shows a section along the line II—II of FIG. 1.

A retaining ring consisting of two retaining ring halves 11 and 12 can further-more be seen in FIGS. 1 and 2; more detail is given hereinafter regarding this retaining ring. The separation places of these holding ring halves are denoted by 13 and 14.

It can be seen that the separation places 9, 10 of the gas guiding ring half shells 2 and 3 are offset by 90° with respect to the respective separation places 13, 14 of the retaining ring halves 11, 12.

The gas guiding ring half shells 2, 3 each have a rib 15 or 16 projecting in the radial direction. It can be seen from FIG. 7 that the ribs 15, 16 have a mutual spacing at a respective separation place 9, 10 of the gas guiding ring half shells 2, 3, so that gaps 17, 36 are present. Only the upper gap 17 is visible in FIG. 7, while the lower gap 36 is covered by the gas guiding ring half shells 2, 3.

Figure 5:
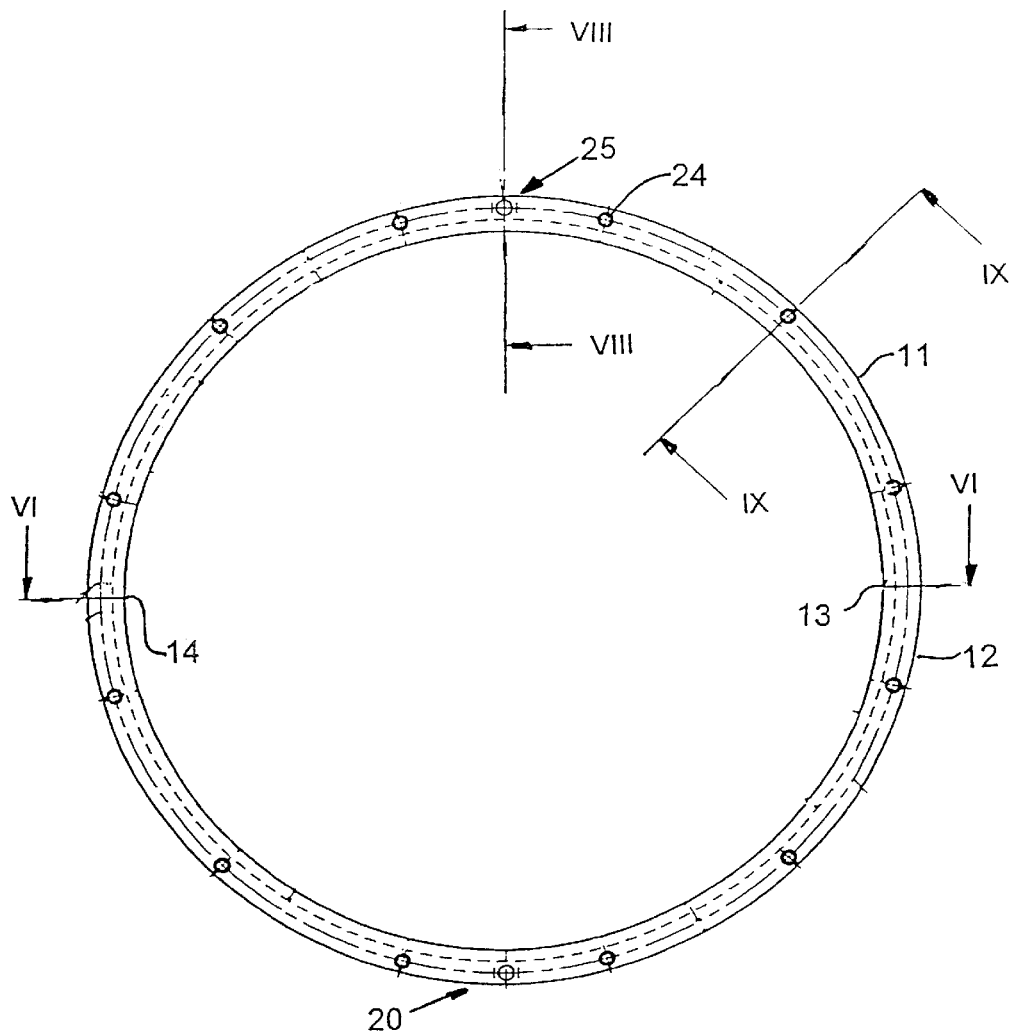
FIG. 5 shows a retaining ring consisting of two retaining ring halves
Figure 6:
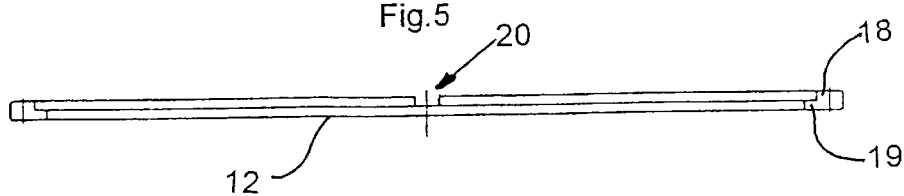
FIG. 6 shows a section along the line VI—VI of FIG. 5.

FIG. 5 shows the whole retaining ring, consisting of the two retaining ring halves 11, 12, while FIG. 6 shows only the retaining ring half 12. Sections through the retaining ring half 11 are shown in FIGS. 8 and 9.

The retaining ring halves 11, 12 have a L-shaped cross sectional shape with a first and a second leg 18, 19. It can be seen from FIG. 6 that the first leg 18 of the retaining ring halves 11, 12 is interrupted, so that a recess shaped as a groove is respectively formed in the middle. The recess of the retaining ring halves 11 is denoted by 25 and the recess of the retaining ring halves 12 is denoted by 20 here.

Figure 3:
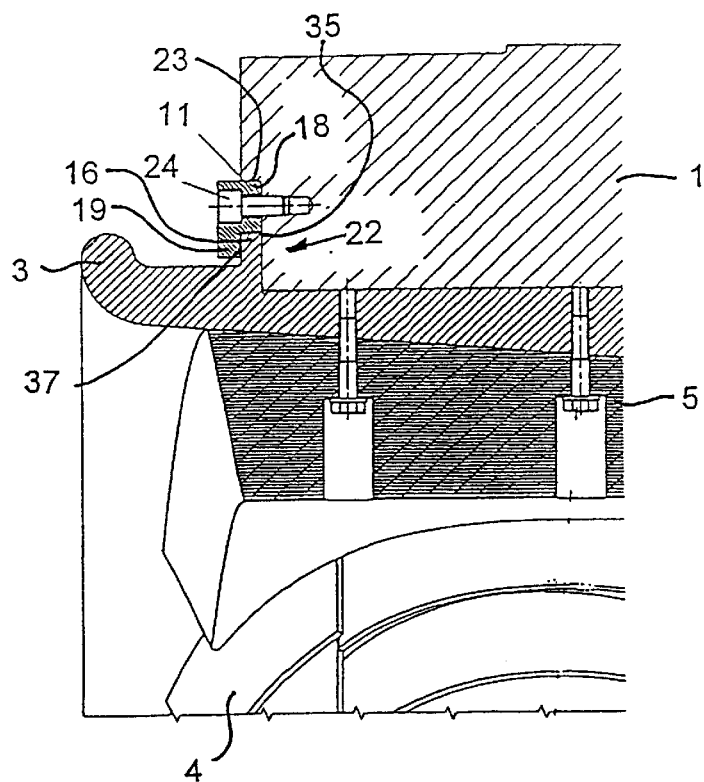
FIG. 3 shows a section along the line III—III of FIG. 1.
Figure 4:
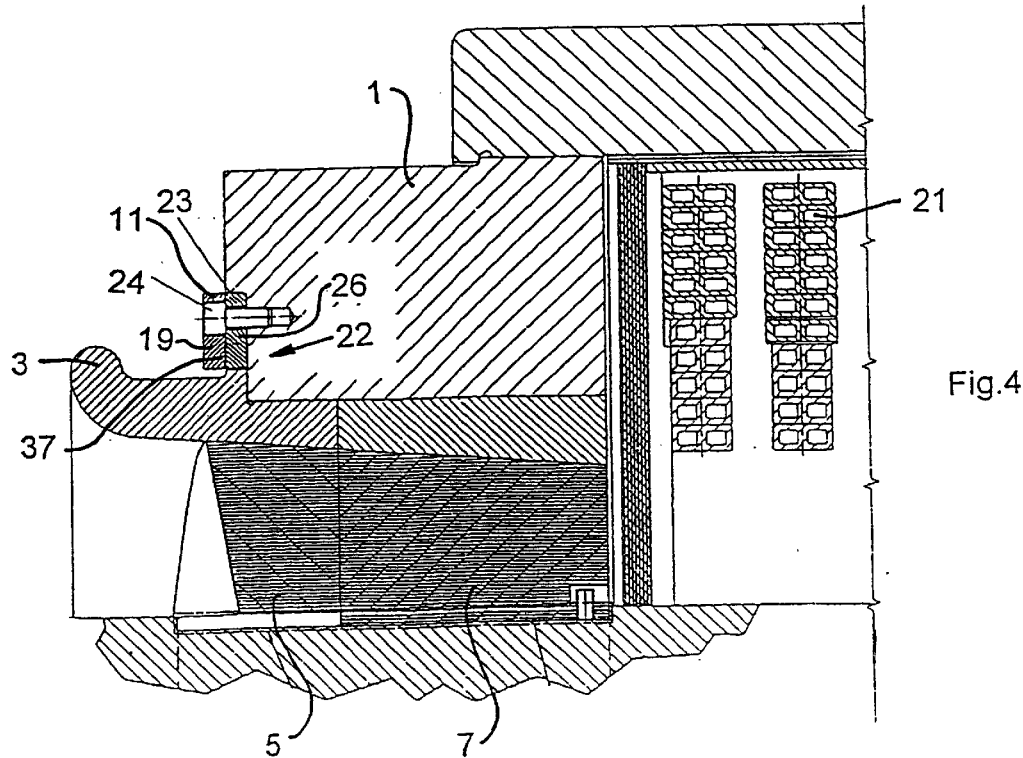
FIG. 4 shows a section along the line IV—IV of FIG. 1.

It can be seen from FIGS. 3 and 4 that the cap plate 1 has an axially recessed region 22 running around it, so that a shoulder 23 is formed. The shoulder 23 has a radial distance from the rib 16 of the gas guiding ring half shell 3. The first leg 18 of the retaining ring halves 11, 12 projects into the annular space thus formed. Only the retaining ring half 11 is visible in FIGS. 3 and 4; however, the retaining ring half 12 has analogous insertion conditions.

The retaining ring halves 11, 12 are securely connected to the cap plate 1 by means of fillister head screws 24. The first leg 18 of the respective retaining ring half 11, 12 abuts laterally on the cap plate 1. On the other hand, the second leg 19 of the L-shaped cross section of the respective retaining ring half 11, 12 abuts on the side of the rib 16 remote from the cap plate 1, i.e., on its outer side. An axial clearance fit 37 is then formed between the second leg 19 and the rib. It is thus apparent that the respective gas guiding ring half shell 2, 3 is secured against an axial displacement relative to the cap plate 1.

Furthermore, the first leg 18 abuts along its outer periphery on the shoulder 23 of the cap plate 1 and along its inner periphery on the rib 15, 16. A radial clearance fit 35 is formed between the rib 15, 16 and the first leg 18. Thus the respective gas guiding ring half shell 2, 3 is also secured against a radial movement with respect to the cap plate 1 and the respective retaining ring half 11, 12 is also secured against a radial movement in the cap plate 1.

As has already been mentioned, the retaining ring halves 11, 12 have recesses 25, 20, which are in particular apparent from FIGS. 5 and 6. These retaining ring halves 11, 12 are arranged between the gas guiding ring half shells 2, 3 and the cap plate 1, as can particularly be seen from FIG. 2. The orientation of the retaining ring halves 11, 12 and the gas guiding ring half shells 2, 3 then corresponds to the orientation of the draftsman's illustration in FIGS. 6 and 7. It follows from this that the recesses 25, 20 in the retaining ring halves 11, 12 coincide with the gaps 17, 36 between the ribs 15, 16 of the gas guiding ring half shells 2, 3.

Fixing wedges 26 are inserted into the gaps 17, 36 and the recesses 25, 20. The dimension of the height 29 of the fixing wedges 26 corresponds to the dimension of the height 28 of the second leg 19 of the L-shaped retaining ring halves 11, 12. The dimension of the depth 27 of the fixing wedges 26 corresponds to the dimension of the depth 30 of the first leg 18 of the retaining ring halves 11, 12. Finally, the dimension of the width 31 of the fixing wedges 26 corresponds to the width of the gaps 17, 36 or of the recesses 25, 20.

As already shown in FIGS. 3 and 4, the retaining ring halves 11, 12 are screwed to the cap plate 1 with fillister head screws 24, with the head of a respective fillister head screw 24 seating in the respective bore 32 of the retaining ring halves 11, 12 with the greater diameter, and the shaft running through the bore 33 with the smaller diameter (FIG. 9).

In the region of the recesses 25, 20, the head of a respective fillister head screw is likewise seated in the respective bore 32 with the greater diameter (FIG. 8). However, the shaft of the fillister head screw screwed to the cap plate 1 runs through the bore 34 of the fixing wedge 26 (FIGS. 10, 11). The head of the tightened fillister head screw 24 is thus situated directly at the fixing wedge 26 (FIG. 4).

When assembling the rotor, the gas guiding ring half shells 2, 3 are first inserted into the cap plate 1. The gas guiding ring half shells 2, 3 are then pressed apart in the separation places 9, 10, and at the respective gaps 17, 36, the two fixing wedges 26 are fitted in and secured by means of a fillister head screw (not shown) to the cap plate 1. Furthermore finally the retaining ring halves 11, 12 are connected to the cap plate 1.

It is thus apparent that the retaining ring halves 11, 12 position the gas guiding ring half shells 2, 3 axially and radially. At the same time, at a short circuit moment, the tangential forces are absorbed by means of the fixing wedges 26. The retaining ring halves 11, 12 are in their turn held against centrifugal force in the described annular space in the cap plate 1. All the parts are designed with the necessary tolerances for a stress-free retaining of the gas guiding ring half shells 2, 3 and in addition are treated with lubricant. It is thus ensured that both in the stationary state and also during shaft rotation, the gas guiding ring half shells are secured in all directions, so that no wear can take place. In operation, however, the gas guiding ring half shells 2, 3 can adapt to the ovalization of the two cap plates 1 at the two rotor ends.

What is claimed is:

1. A rotor of a directly gas-cooled electrical turbomachine, which rotor has at each of said rotor's two axial ends a respective gas guiding ring connected to a cap plate of the rotor and including two gas guiding ring half shells with separating places, wherein a retaining ring, including two retaining ring halves with separation places and connected to the gas guiding ring half shells, is securely connected to the cap plate, in order to position the gas guiding ring axially and radially with respect to the cap plate, the respective separation place of the gas guiding ring half shells being offset by at least about 90° relative to the respective separation place of the retaining ring halves;

ribs projecting, respectively in the radial direction, from the respective gas guiding ring half shells, abut laterally on the cap plate, and a respective fixing wedge is inserted at the respective separation places of the gas guiding ring half shells in gaps between the ribs, abuts the retaining ring halves on both sides in recesses of the retaining ring halves, and is securely connected to the cap plate.

2. The rotor according to claim 1, wherein the cap plate has an axially recessed region for forming a shoulder, said shoulder being arranged at a radial distance from the respective rib, so that an annular space is present between the shoulder and the ribs, in which annular space at least a first leg of the retaining ring halves connected to the cap plate is arranged, which first leg abuts along an outer periphery of the first leg on the shoulder of the cap plate and laterally on the cap plate, and also have a clearance fit to the rib along their inner periphery.

3. The rotor according to claim 2, wherein each retaining ring half has an L-shaped cross sectional shape, a second leg of the L-shaped retaining ring halves being constituted and having a clearance fit to the side of the respective rib remote from the cap plate.

4. The rotor according to claim 1, wherein the ribs of the gas guiding ring half shells have a mutual spacing at the separation place in order to form a gap, and the first leg has a recess coinciding with the gap; a respective fixing wedge being inserted at the gaps and the recesses.

5. The rotor according to claim 4, wherein the dimension of the height of each fixing wedge corresponds identically to the dimension of the height of the second leg of the respective retaining ring half, the dimension of the depth of each fixing wedge corresponds identically to the dimension of the depth of the first leg, and the dimension of the width of each fixing wedge corresponds to the width of the gaps or of the recesses.

6. The rotor according to claim 5, wherein the retaining ring halves and fixing wedges are connected to the cap plate by means of fillister head screws having a head and a shank, the head of the fillister head screw being arranged countersunk in the second leg of the respective retaining ring half, and the shaft running through the first leg or the fixing wedge, such that the head of the fillister head screw screwed into the cap plate is supported on the first leg or on the respective fixing wedge.

7. A process for the assembly of the rotor according to claim 1, comprising the steps of:

inserting the gas guiding ring half shells into the cap plates;

pressing apart the cap plates;

fitting and securing the fixing wedges are fitted into the gaps between the separation places of the gas guiding ring half shells;

releasing the gas guiding ring half shells and positioning the retaining ring halves with clearance fit on the gas guiding ring half shells;

screwing the retaining ring halves to the cap plate.

\* \* \* \* \*